United States Patent [19]

Maurer et al.

[11] 4,004,135
[45] Jan. 18, 1977

[54] JACQUARD CARD TO MAGNETIC TAPE ARCHIVES STORAGE AND RETRIEVAL SYSTEM

[75] Inventors: Gottfried Maurer, Needham, Mass.; Emil Meier, Wadenswil, Switzerland

[73] Assignees: Viable Systems, Inc., Needham, Mass.; Gessner A.G., Wadenwil, Switzerland; part interest to each

[22] Filed: Oct. 23, 1974

[21] Appl. No.: 517,243

[52] U.S. Cl. .............................. 235/61.1; 139/68; 139/319

[51] Int. Cl.² ................ G06K 1/02; D03C 1/00; D03J 1/10

[58] Field of Search ........... 340/172.5; 235/61.12, 235/61.1, 151.1, 61.7 R, 61.6 R, 151; 139/59, 68, 85, 319; 234/59, 67, 69, 74, 79; 360/1

[56] References Cited

UNITED STATES PATENTS

| | | | |
|---|---|---|---|
| 3,143,724 | 8/1964 | Willoughby et al. | 235/61.6 R |
| 3,473,157 | 10/1969 | Little et al. | 340/172.5 |
| 3,505,502 | 4/1970 | Yanai | 235/61.1 |
| 3,529,298 | 9/1970 | Lourie | 340/172.5 |
| 3,629,558 | 12/1971 | Coggin | 235/151.1 |
| 3,671,944 | 6/1972 | Dubner | 340/172.5 |
| 3,744,035 | 7/1973 | Gerrhos et al. | 340/172.5 |
| 3,766,528 | 10/1973 | Ichida | 340/172.5 |
| 3,820,082 | 6/1974 | Bauknecht et al. | 340/172.5 |
| 3,844,139 | 10/1974 | De Cerjat et al. | 235/151.1 X |
| 3,918,633 | 11/1975 | Maurer | 235/61.11 B |

Primary Examiner—Daryl W. Cook
Attorney, Agent, or Firm—Richard L. Stevens

[57] ABSTRACT

A Jacquard card is placed in information-transfer relationship with an optical reader. Weave information, including an identification number and number of picks, is placed in a computer. The weave pattern is read row by row and pick by pick and stored on magnetic tape. To retrieve the weave pattern, the magnetic tape is searched and the information is output on paper tape. The paper tape is then used to produce a Jacquard card.

14 Claims, 15 Drawing Figures

JACQUARD CARD TO MAGNETIC TAPE ARCHIVES STORAGE AND RETRIEVAL SYSTEM

BACKGROUND AND BRIEF SUMMARY OF THE INVENTION

In the textile weaving industry, the weave patterns are contained in Jacquard cards (Cards). These Cards require considerable storage area because of their bulk. Also, if stored for long periods of time, they tend to deteriorate. In addition to the problems of bulk and deterioration, to retrieve a weave pattern stored on a specific Card requires considerable time. Therefore, there exists a need for a system wherein weave patterns may be stored in a minimum of space and the patterns rapidly retrieved from a storage medium.

The invention relates to an apparatus and method for converting weave patterns of Jacquard cards to machine information or data, indexing or addressing the data, and storing the data. When the information is required, the data is addressed and retrieved and converted to weave pattern information either on a Card or other suitable medium. In one embodiment of the invention, a reading head including sensors is placed in information transfer relationship with the weave pattern in a Card. The weave pattern is converted to machine data and stored on a medium such as magnetic tape. This results in the ability to store 3,000 patterns on 100 reels of stardard 9 inch magnetic tape. Storage on such a medium allows picks to be added, deleted, or modified; and further, any section of a pattern may be output.

In another embodiment of the invention, a Card is placed in information transfer relationship with an optical reader. The information is converted into machine data and addressed and stored on magnetic tape. To retrieve a pattern, the pattern is addressed, the tape is read through a computer, and the computer then drives an output device, such as a standard piano punch or paper tape punch.

In the preferred embodiment of the invention, a transport system is provided to place the card in information transfer relationship with a means to convert the weave pattern into machine data. The transport system effects relative movement between the Card and the conversion means. The transport system includes a support structure for the Card and a drive mechanism for movement of the Card. The support structure comprises first and second aperture plates, between which the Card travels. The drive mechanism includes drive sprockets, which engage the LCard and the timing device to control the relationship between the rate of movement of the Card and the computer operation. The apertures in the aperture plates are in register with one another, and are patterned in alternating offset sequence, such that when the holes in the Card are aligned therewith, a reading may be taken.

The means to convert the pattern into weave information includes an energy source and a reading head. The reading head reads the hole pattern of selected portions of the Card in terms of hole/no hole information. The energy source provides the stimulant for the reading head. More particularly, the energy is light energy and disposed on the one side of the aperture plates and the eading head on the other side. Where there are holes in the cards, the energy will be transmitted, indicating holes; and where there are no holes, no energy will be transmitted, indicating no holes. The reading head comprises a plurality of sensors such as a photodiode array, each photo diode in optical communication with an aperture which receives the light energy and a latch circuit to store the information.

Although transmission through the aperture plates of radiant energy (wave or particle) is used in the preferred embodiment, any type of optical system wherein the beam is transmitted, reflected, fluoresced, quenched, etc., may be used. Also, thelight energy may be ultraviolet, infrared, white, and of any wave length. Also, any electro-mechanical method may be used, whereby fingers or contacts will sense the presence of holes.

A computer controls the operation of all components of the invention and, as programmed, basically: (a) controls the travel of the cards through the plates; (b) reads and stores weave information; (c) addresses the information; and (d) records the information in a storage medium.

In the preferred embodiment of the invention, the computer reads each pick twice, compares the weave information of each pick; if an error exists, identifies such error; and outputs the errors for visual identification.

As the card travels between the plates, the information is continuously read. After one pick has been read, the pick information is stored in the computer memory and a pick number is assigned. A second reading head is provided, and the first pick is reread and compared with the information of the first pick stored in the computer memory. If the information matches, the information is then transmitted to storage. If the information does not match, the computer identifies the error(s) and this is brought to the attention of the operator.

The storage system of the preferred embodiment of the invention is a tape storage system, and it provides reliable and particularly easy access. However, if desired, punched paper tape, cassette magnetic tape, or magnetic discs may be used. The information, once stored, is retrieved by addressing the desired weave pattern in the storage. The computer selects the information and controls the operation of a device such as a card cutting machine to reproduce the weave pattern in usable form.

The apparatus of our invention is directed to a system for storing and retrieving Jacquard card weave information, which comprises means to convert the weave information to machine language, means to place the Jacquard card in information transfer relationship with the converting means, means to effect relative movement between the card and the converting means, means to index the information, and means to store the information.

The method of our invention includes placing the Jacquard card into information transfer relationship with a reading head, reading the information from the Jacquard card; converting the information to machine data, addressing the information so converted, and storing the information on a recording medium.

DESCRIPTION OF THE PREFERRED EMBODIMENT(S)

Figure 1:
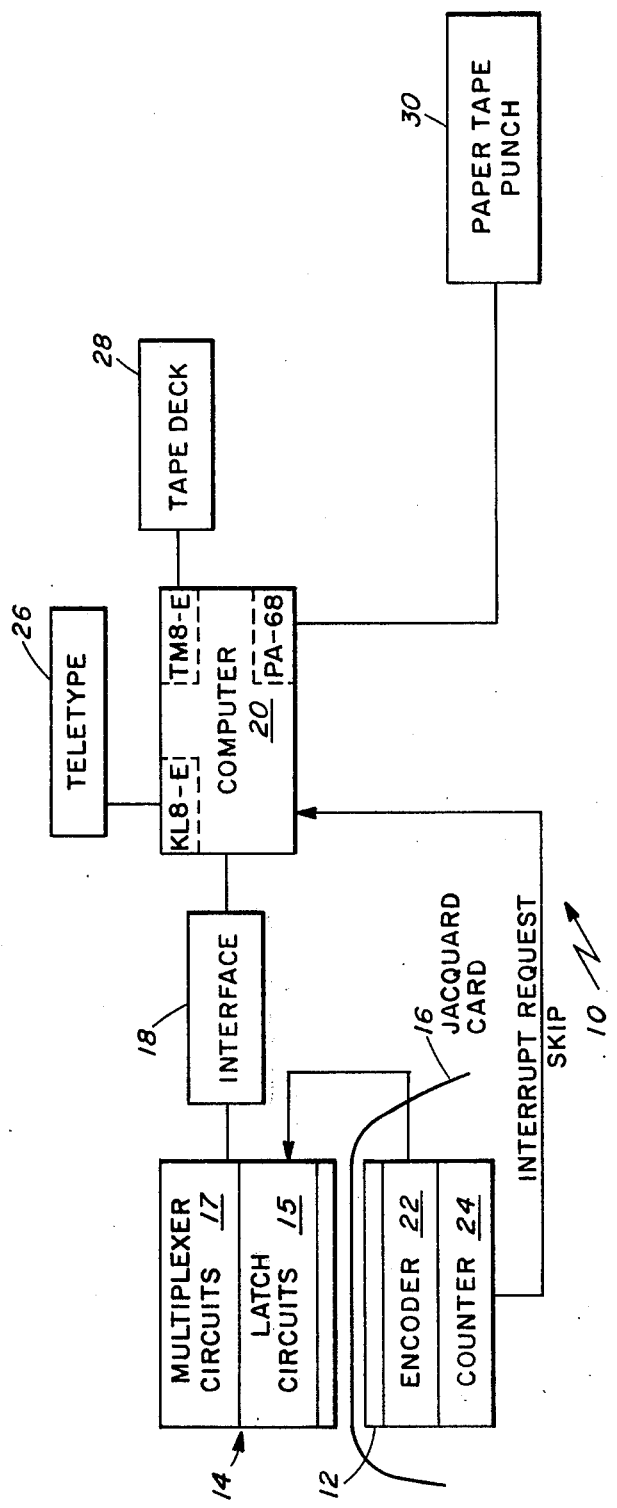
FIG. 1 is a functional block diagram of the system.

A preferred embodiment of the invention is shown in FIG. 1 at 10 and comprises a transport system 12 for the movement of a Jacquard card (Card) 16. An optical reader head 14 includes photosensors 54, latch circuits 15 to read and store the weave information, and multiplexer circuits 17, and communicates with the transport system 12. An interface 18 converts the information to computer language and transmits the same to a general purpose digital computer 20. The computer 20 controls the movement of the Card 16 through the transport system; and the reading, comparing, storage, and retrieval of the information. The weave information is transferred to and stored on a magnetic tape deck 28. The computer 20 also retrieves selected weave information and it controls the display of the weave information, such as by the operation of a paper tape punch 30. Communication between the operator and the computer 20 is accomplished via a teletype 26.

DRIVE TRANSPORT SYSTEM

Figure 2:
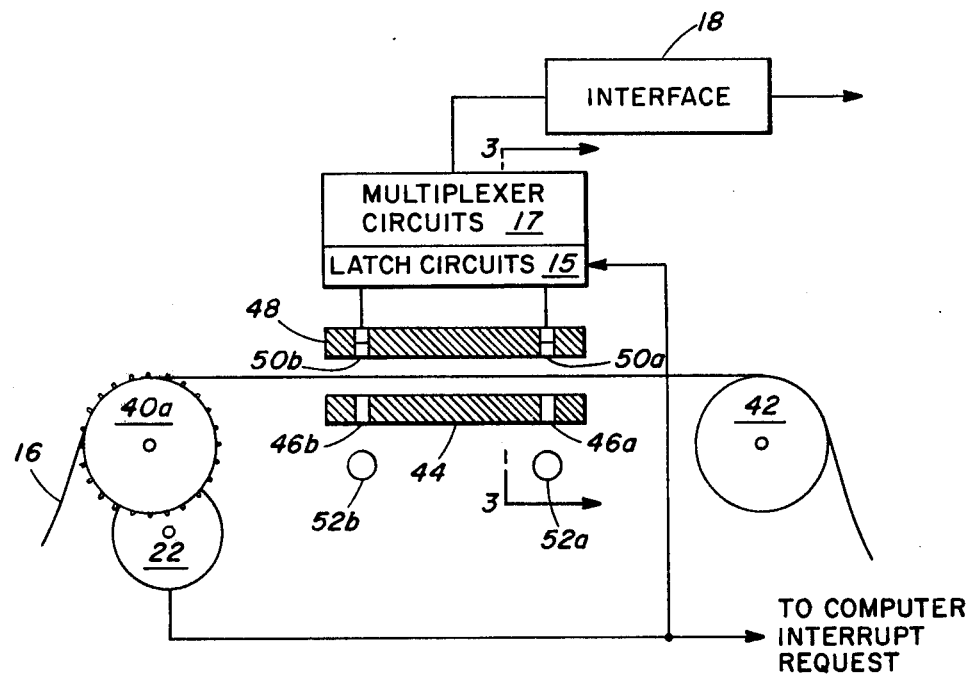
FIG. 2 is a front schematic of the transport system.

The transport system is shown schematically in FIG. 2. A card 16 passes over a support roller 42 and between upper and lower aperture plates 44 and 48. The card, as is well known, may include a maximum of 1344 holes representing one pick and may contain as many as 4000 picks. The 1344 holes comprise 8 rows of 168 possible holes in alternating offset alignment. These rows are divided into 3 segments. At the edges of the Card and between segments are sprocket holes 13 extending longitudinally of the Card and form a total of 4 longitudinal lines of sprocket holes. Between each pick, 8 rows of 168 holes, is a blank section which dimensionally corresponds to one blank or no-hole row.

The plate 44 supports the Card 16 and includes first and second sets of apertures 46a and b. The apertures 46a correspond to the hole pattern for one row of a pick on a Jacquard card comprising a total of 168 holes. That is, there are 168 apertures of 3 sections in offset alternating relationship, FIG. 4. The apertures 46b on plate 44 are in an identical pattern and parallel to and spaced apart from the apertures 46a and dimensionally are seven rows of 168 holes plus one blank row spaced apart from the first apertures. Disposed below each set of apertures are lamps 52a and b respectively. The apertures' spacing is such that when the first row of 168 holes pick (n) is aligned over apertures 46b, then the first row of the second pick (n+1) is aligned over apertures 46a, FIGS. 4 and 5. The upper aperture plate 48 has a similar aperture pattern as plate 44, includes aperture rows 50a and b, and is parallel to and spaced apart from plate 44, with the rows of apertures of both plates in register. Thus, when the row of a pick is in alignment with the apertures of the plates 44 and 48, the light energy passes through the apertures of the plate 44, through the holes where they exist in the row of the Card 16, and through the apertures of the plate 48. The light energy strikes the photosensors 54, which are received in the apertures of the plate 48, FIG. 3. Thus, where there are no holes in the row of the pick, no light energy will be transmitted.

Figure 4:
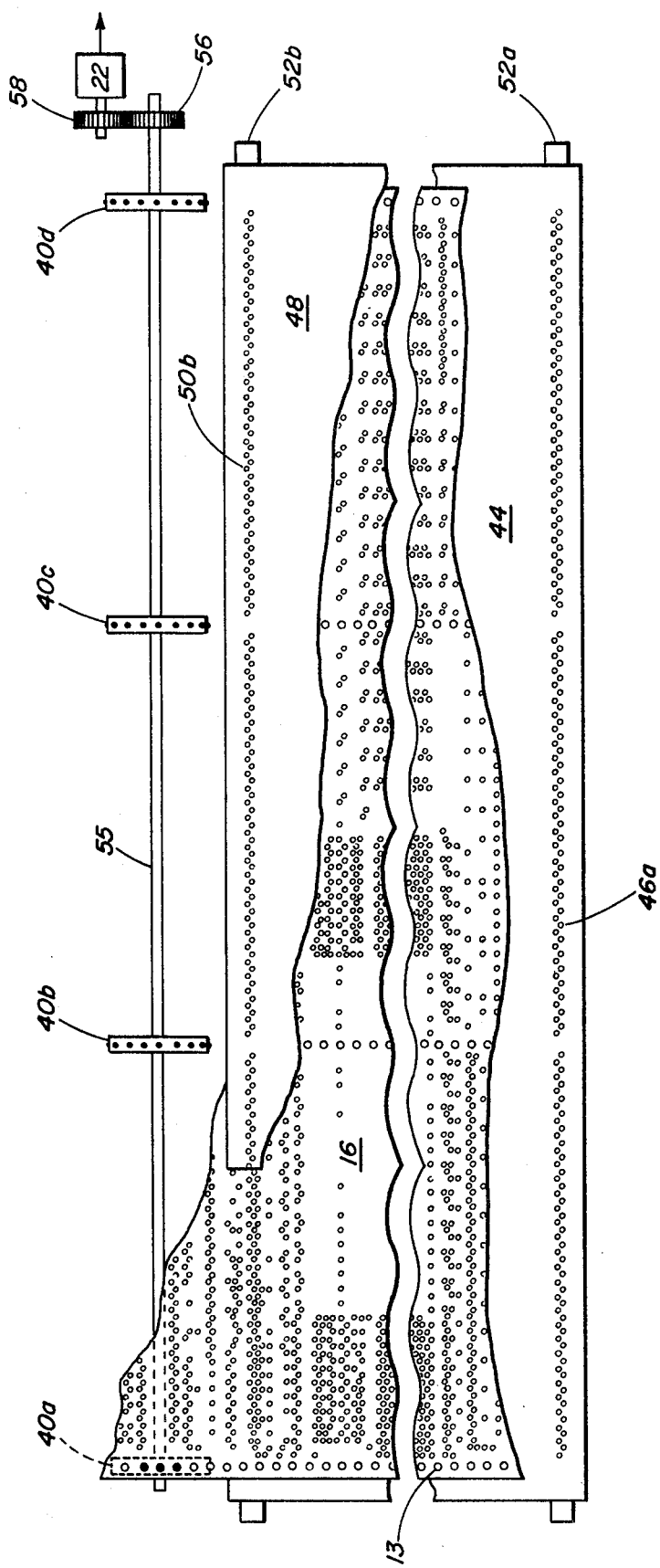
FIG. 4 is a plan fragmentary view of the transport system.
Figure 5:
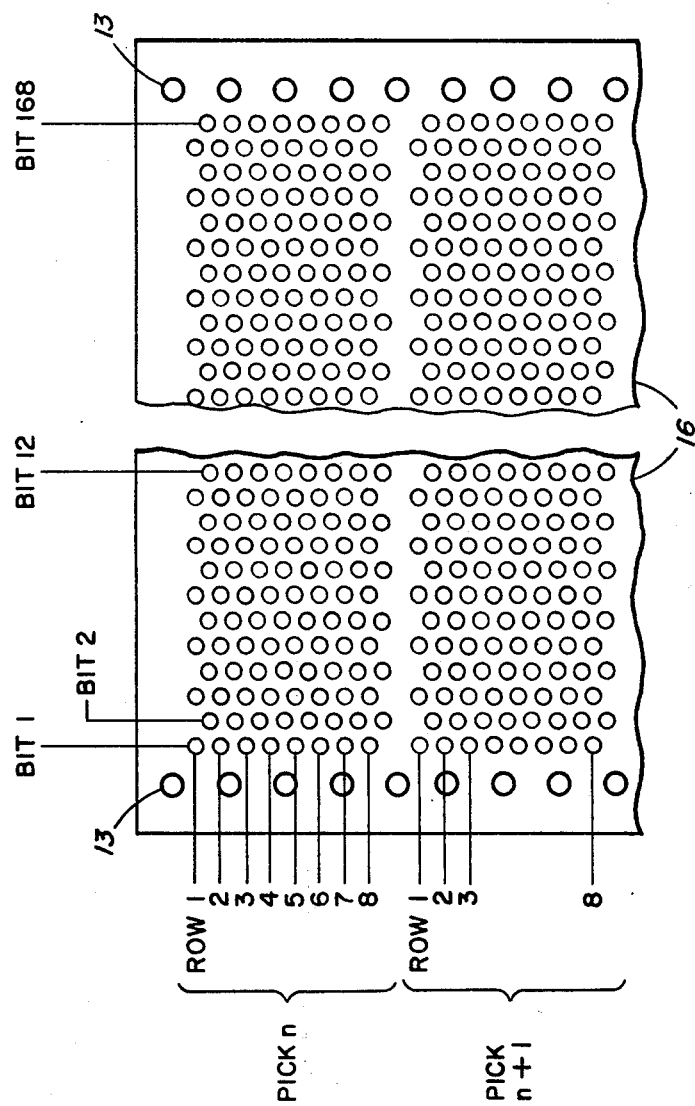
FIG. 5 is a plan fragmentary view of a Jacquard card.
Figure 8:
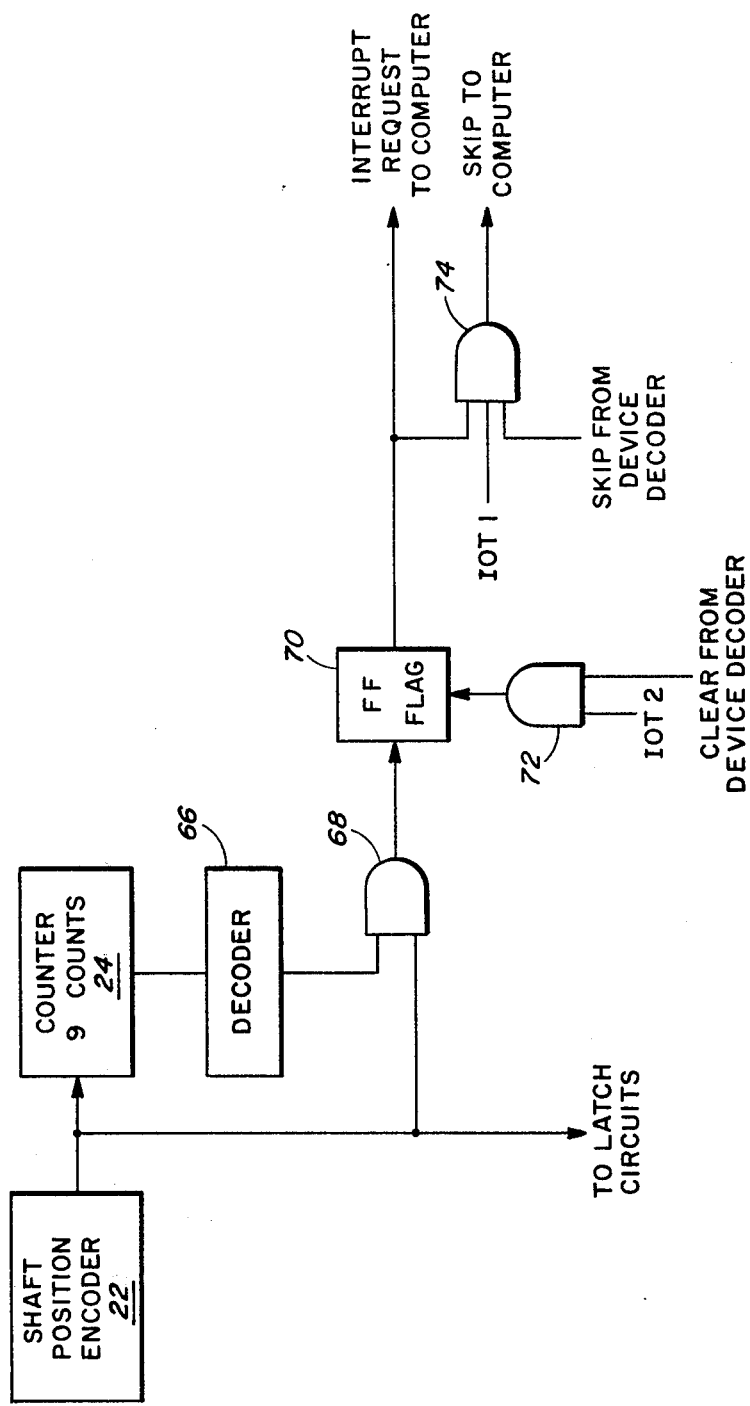
FIG. 8 is a timing schematic of the circuit employed which controls the position of the Jacquard card and the reading of the data.

The Card 16 engages the teeth of the drive sprockets 40a-d, as shown most clearly in FIGS. 2 and 4, which sprockets 40a-d are driven by a motor (not shown). A common shaft 55 includes a gear 56 which meshes with a gear 58 on a shaft encoder 22. Referring to FIGS. 1 and 8, the output of the shaft encoder 22 is received by a counter 24 and the latch circuits 15.

OPTICAL READER

Figure 6:
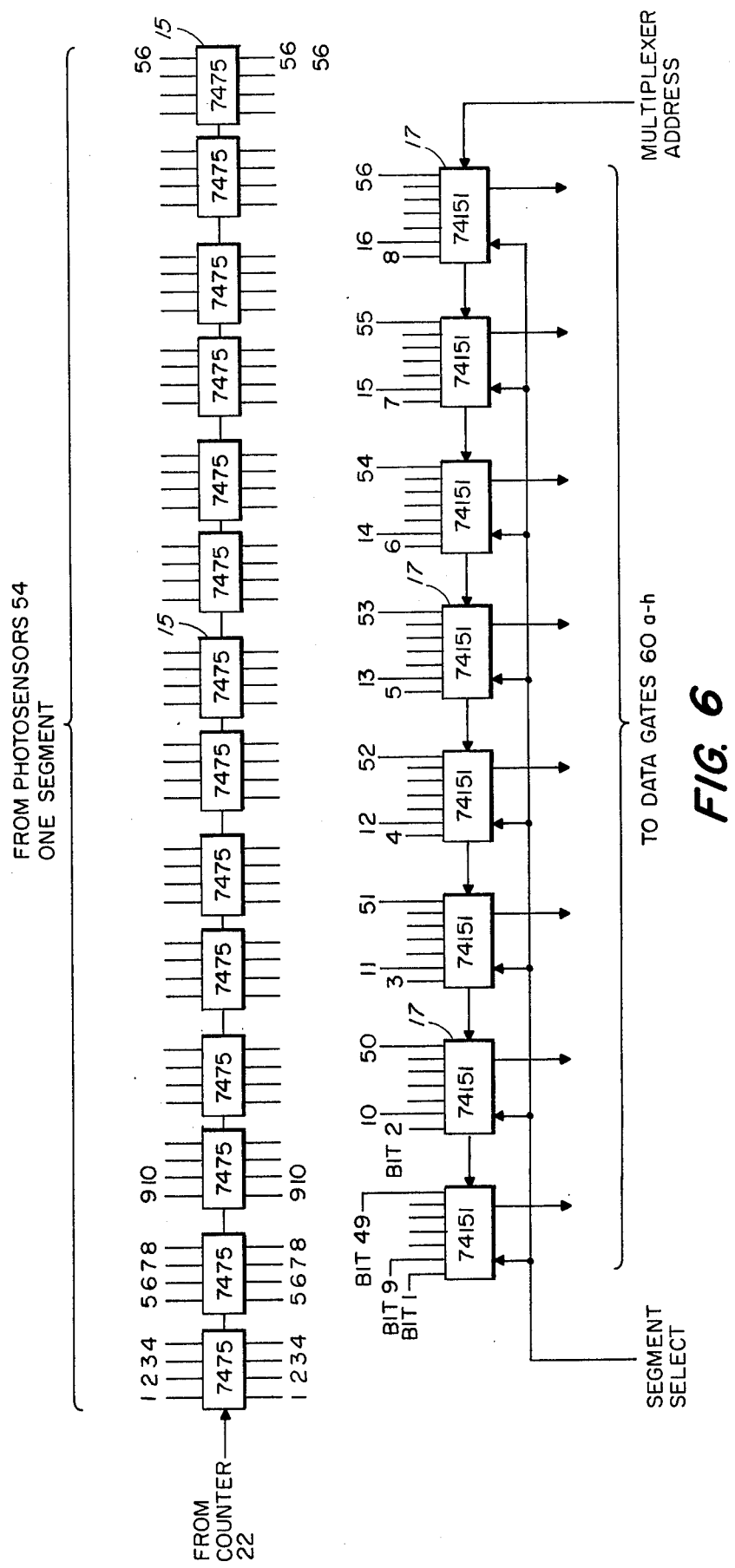
FIG. 6 is a functional block diagram of the latch and multiplexer circuits.

The optical reading head 14 comprises the photosensors 54 received in the apertures 50a and b of the plate 48, the latch circuits 15 which communicate with the photosensors 54 and the multiplexer circuits 17, FIGS. 1 and 6. There are two sets of 168 photosensors.

Figure 3:
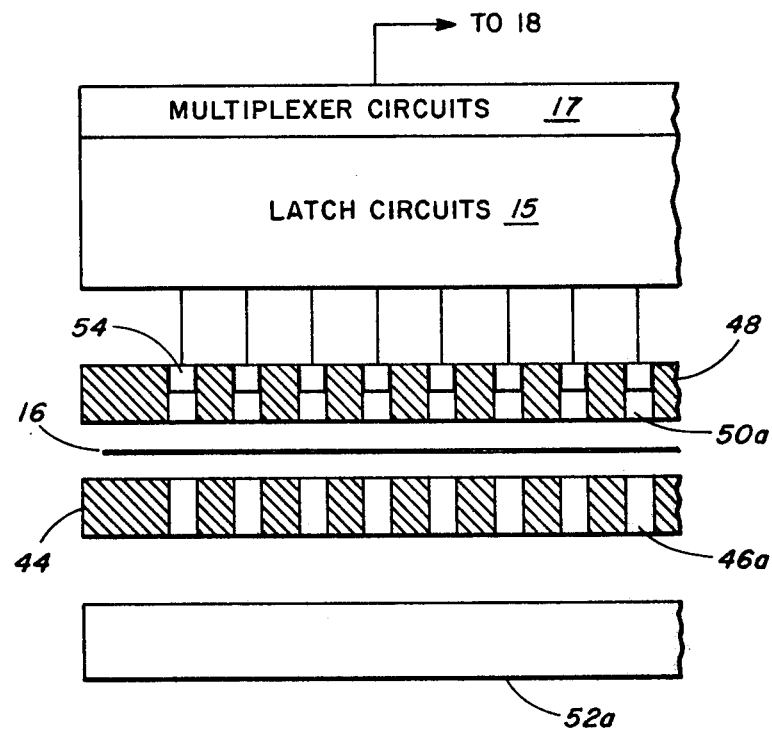
FIG. 3 is a fragmentary front elevational view of the optical reader.

The weave information for the row of the pick in alignment is read as hole/no hole or light/no light, and temporarily is stored in the circuits 15. Referring to FIG. 3, the photosensors 54, such as Texas Instruments type LS600 are mounted in each aperture of the plate 48. The output from each photosensor is received in type 7475 latch circuits, which communicate with the multiplexer circuits 17. The encoder 22 provides a signal to the circuits 15 whereby the output data is latched for the particular pair of rows read. At the command of the computer 20, the data is multiplexed in the multiplexer circuits 17. In FIG. 6, a block diagram of the multiplexer circuits 17 for 56 bits of data and the latch circuits 15 are shown for one segment. As previously described, a pick comprises 8 rows of 168 possible holes. The photosensors 54 read hole/no hole information on 168 holes or one row. Each third of a row is a segment or 56 bits of data. There are 6 segments of data to be read for one row of each of two picks n and n+1. Each segment comprises 7 groups of 8 bits of data. As programmed the data is multiplexed in the following manner: First, a segment is selected; then a group within that segment. As each group is sequentially selected, the data is stored in the computer memory. After a first row has been read, the succeeding rows of the pick are sequentially read until the entire pick has been read and stored, FIG. 7.

TIMING SYSTEM

Referring to FIG. 8, the shaft encoder 22 provides an output pulse which corresponds to one row of the pick and 8 pulses equals the movement of 8 rows of the pick in alignment with the apertures. The movement of one pick, eight rows and one blank row, the spacing between picks, thus corresponds to 9 pulses. The output from the shaft position encoder 22 generates an "interrupt request" pulse to the computer to insure that the row is read as properly aligned and the data multiplexed, temporarily stored, compared, and stored. The "interrupt request" provides a "read time" such that 336 bits of data, 168 from each of successive picks, is fed to the computer. The output from the encoder also latches in the latch circuits 15 the output data from all of the photosensors 54, storing the pattern of holes/no holes in that particular pair of rows. As previously described, each third of a row of the pick is considered a segment, and reading the two rows, i.e., the row aligned with apertures 46b and 50b pick n and the row aligned with apertures 46a and 50a, pick n+1; there are six segments of data, each containing seven groups of 8 bits. The data is multiplexed each time the computer 20 receives and "interrupt request" by selecting a segment, then a group within that segment. As each group in turn is selected, the computer 20 stores transmitted data in its memory. The stored data from the previous pick n of a specific row is compared with the second reading taken now of the same row of the pick and any difference is noted. The data from the row of pick n+1 is stored for comparison on the next reading. If any error is detected, the error is tagged and stored for later printout.

The "interrupt request" is transmitted by a flag flip-flop 70. The output from the encoder 22 is monitored by a counter 24. A decoder 66 transfers eight of 9 pulses to an AND gate 68. The gate 68 also receives an input directly from the encoder 22. During counts 0–7 corresponding to rows 1–8 of a pick, gate 68 receives both inputs and the "interrupt request" to the computer continues. For count 8, or no row or between picks, the gate 68 is disabled and no "interrupt request" goes to the computer. The function of the gates 72 and 74 will be described in detail in the operation of the invention.

Figure 7:
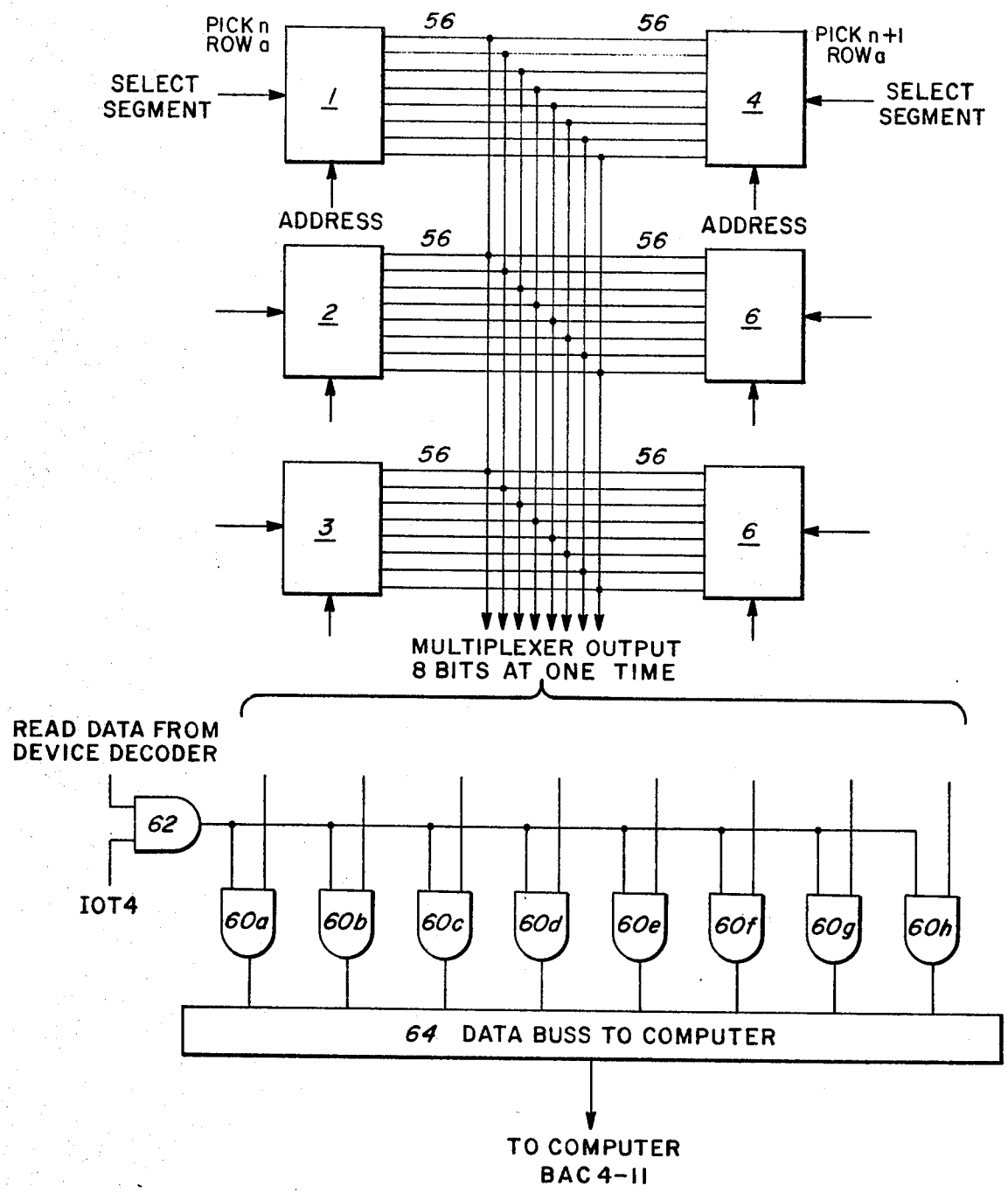
FIG. 7 is a functional block diagram of the multiplexer circuit output and a portion of the interface.

Referring first to FIG. 6, the latch circuits 15 for each segment comprise fourteen latch circuits 15, each capable of storing four bits of information. The fourteen circuits as shown comprise one segment and store 56 bits of information. The input for the circuits is received from the photosensors 54 and the circuits 15 are latched until such time as the computer requests the information. The eight multiplexers 17, which comprise a segment, are addressed seven times; each time one group worth 8 of information is transmitted. When all the information has been transferred from the latch circuits 15 FIG. 6 comprising the first segment, the subsequent segments 2, and 3 for pick n; and segments 4, 5, and 6 for pick n+1 are sequentially addressed in the same manner. As shown in FIG. 7, the multiplexed output is 8 bits at a time. As the information is output, it is transmitted to the AND gates 60a-h, which transmit their output to the computer accumulator via data buss 64, which in turn transmits the information to the computer memory.

The timing between the computer 20, the positioning of the Jacquard card 16 and the reading of the information is accomplished by the shaft position encoder 22, the counter 24, decoder 66, and associated components as shown in FIG. 8. The shaft position encoder 22 provides a pulse to the latch circuits 15, whereby the latch circuits store the information until requested to transfer the information by the computer. The computer will continue to request the information as each row is aligned with the apertures 46a-50a and 46b-50b in the plates 44 and 48 by the "interrupt request" to the computer 20, which is transmitted from the gate 68 via the flag flip-flop 70. The decoder 66 inhibits gate 68 for the 9th row or 8th count (first pulse is count 0) to inhibit the "interrupt request" to the computer.

Referring to FIG. 7, the interface 18 between the latch circuits 15 and the computer 20 includes the gates 60 and data buss 64 as previously described. The interface 18 also includes, referring to FIG. 9, a device decoder 76 which is adapted to receive buffered memory bits from the computer, specifically, six buffered memory bits 3,4,5,6,7, and 8, and comprise six inputs AND gates arranged to provide the following inputs: 3 outputs from device decoder 76, lines a, b, and c sequentially combined with 1, 2 and 4, IOT outputs to the group select decoder 78; an encoder 80 converts the signals from decoder 78 to binary form for the multiplexer address; two outputs from the device decoder 76 lines e and f plus outputs 1, 2, and 4 IOT are received by a sement select decoder 82 to provide for the proper sequential selection of the segments; and the output of line a combined with 1 IOT provides the skip input for gate 74, FIG. 8; the output of line a combined with 2 IOT provides the clear input for gate 72, FIG. 8; and the output of line d combined with 4 IOT provides the read input for gate 62, FIG. 7.

COMPUTER

The computer 20 employed in the preferred embodiment of the invention may be any general purpose digital computer and for purposes of the preferred embodiment, the invention is described with a Digital Equipment Corporation Digital Computer PDP-8. After the computer has been initialized or cleared, the four basic modes of operation are read into and stored in the computer memory. This may be accomplished by an auxiliary device such as punch card, magnetic tape, etc., or any medium compatible with the computer input. In the preferred embodiment, a teletype unit 26 such as an ASR-33 is used with the symbols 0 and — representing holes and no holes. The instructions corresponding to the four basic modes are read into the computer 20 from the teletype 26.

The control of the computer 20 is accomplished through the instructions. The instructions are written in the terms of the particular mode of operation desired. The computer thus has stored in its memory the routines corresponding to each mode of operation of the computer.

Figure 10:
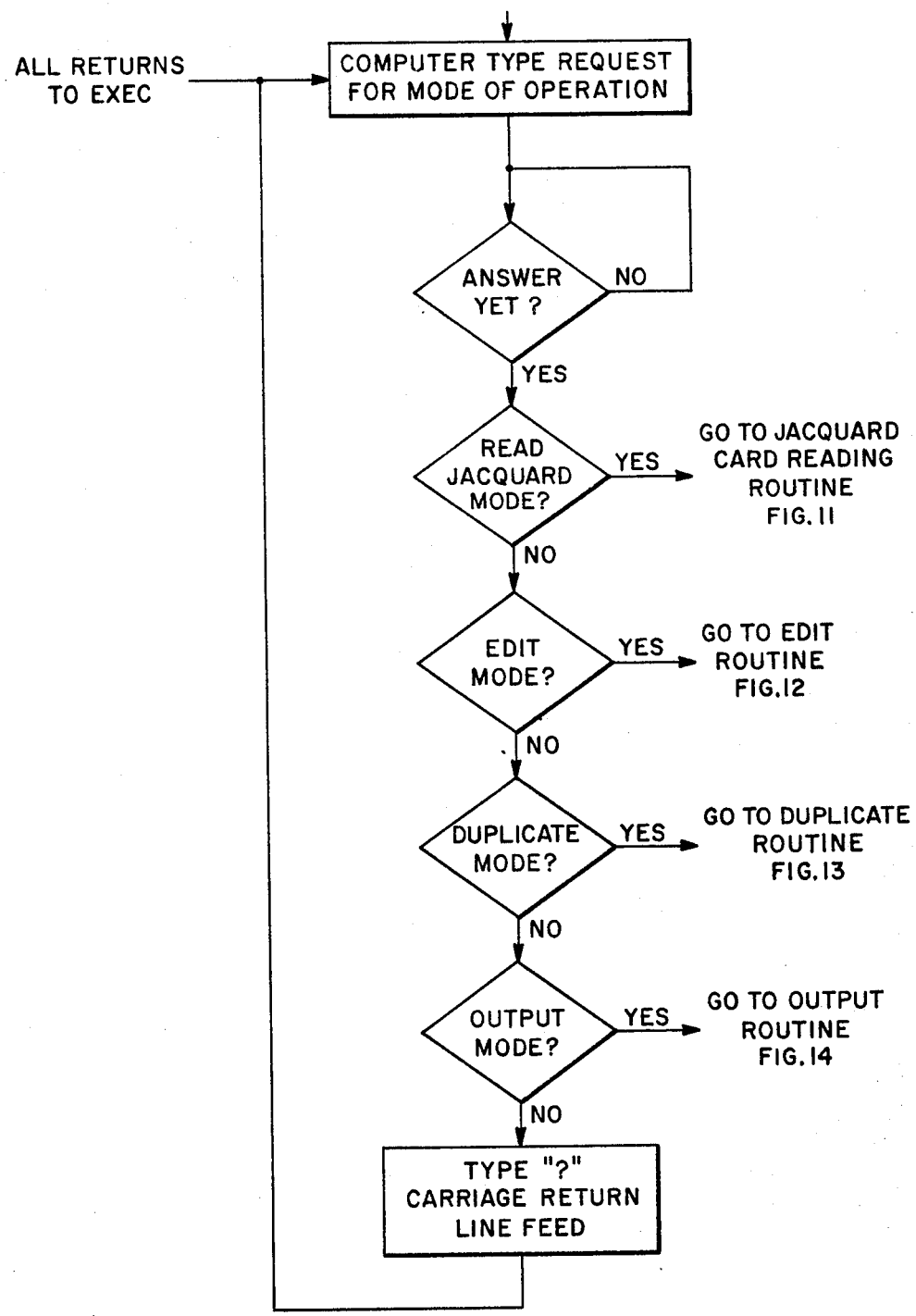
FIG. 10 is a flow chart of the general executive controller.

The general program of the computer is shown in FIG. 10, and broadly is as follows:

1. Initialization — the computer types a request to the operator to select a mode of operation.
2. Selection — the operator selects the mode of operation, then types through the teletype the instructions for that mode.
3. Operation — the computer returns to type out the request for further instructions.

The four subroutines stored in the computer are set forth in FIGS. 11, 12, 13, and 14, and comprise the read mode, the edit mode, the duplicate mode, and the output mode. As indicated above, the computer, after it is supplied with the necessary information, performs the four functions as requested: read, edit, duplicate and output. Any standard computer language consistent with the capability of the computer can be used for the instructions. The subroutines are not described in detail since they can be written in any desired notation, format, or sequence, depending upon the particular type of computer being utilized, computer language, etc.

OPERATION

The operation of the invention will be described in reference to a Teletype Corporation teletype model No. ASR-33 in combination with a Digital Equipment Corporation Digital Computer PDP-8 having an 8K memory. The interface for the transfer of information between the teletype and the computer is incorporated in the computer and identified as DEC type KL8-E. The storage medium for the information is a tape deck, such as a DEC type TU-10, and the interface for the transfer of information between the tape deck and the computer 20 is within the computer and identified as DEC type LTM8-E.

The general program and routines for the various modes of operation are placed in the computer memory by the teletype 26.

The above interfaces are commonly available and need not be described in further detail.

Referring to FIGS. 2 and 4, the sprocket holes 13 of the Jacquard card 16 having a weave pattern thereon in hole/no hole representation, as is well known, engage the teeth of the drive sprocket 40a, b, c, and d. The Card 16 is placed over the aperture plate 44 and the support roller 42. The support roller insures that the Jacquard card passes between the aperture plates 44 and 48 in the proper position, such that no tearing or nonalignment occurs. The Jacquard card is positioned such that the first row of a possible 168 holes, pick n, is spaced one row before the apertures 46a of the lower aperture plate 44 and 50a of the upper aperture plate 48.

Figure 9:
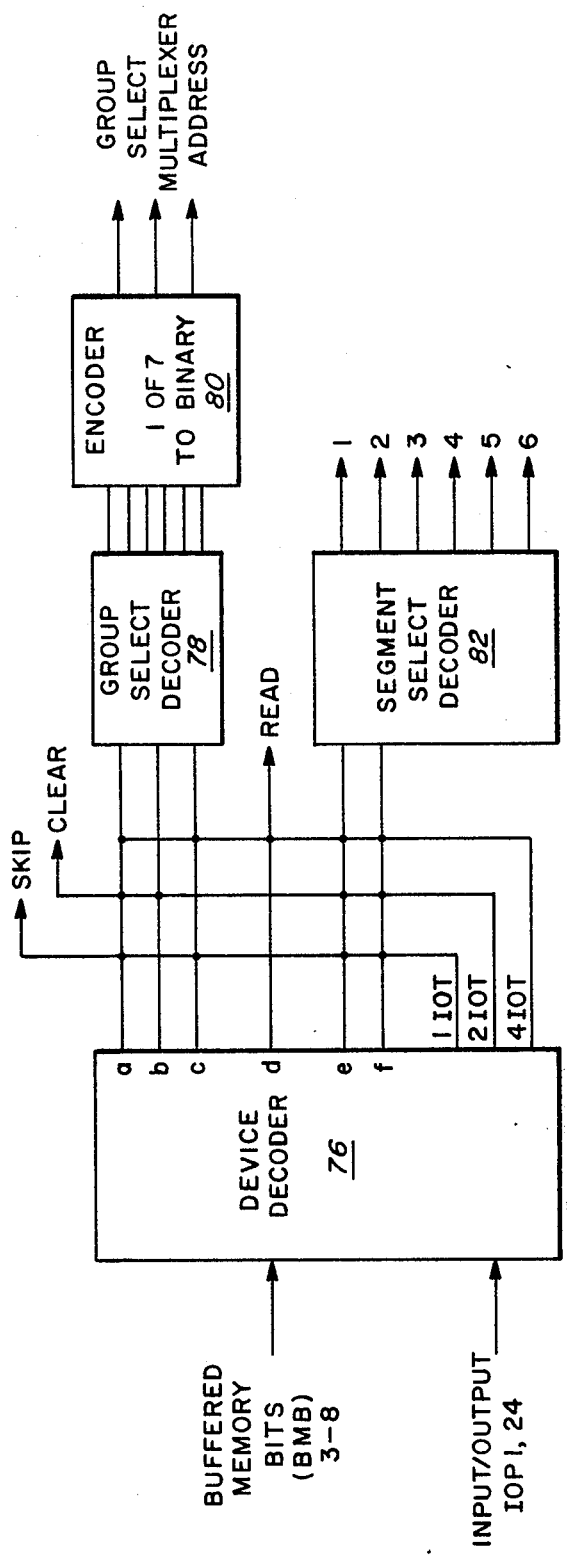
FIG. 9 is a functional block diagram of the interface between the computer and the transport system.
Figure 15:
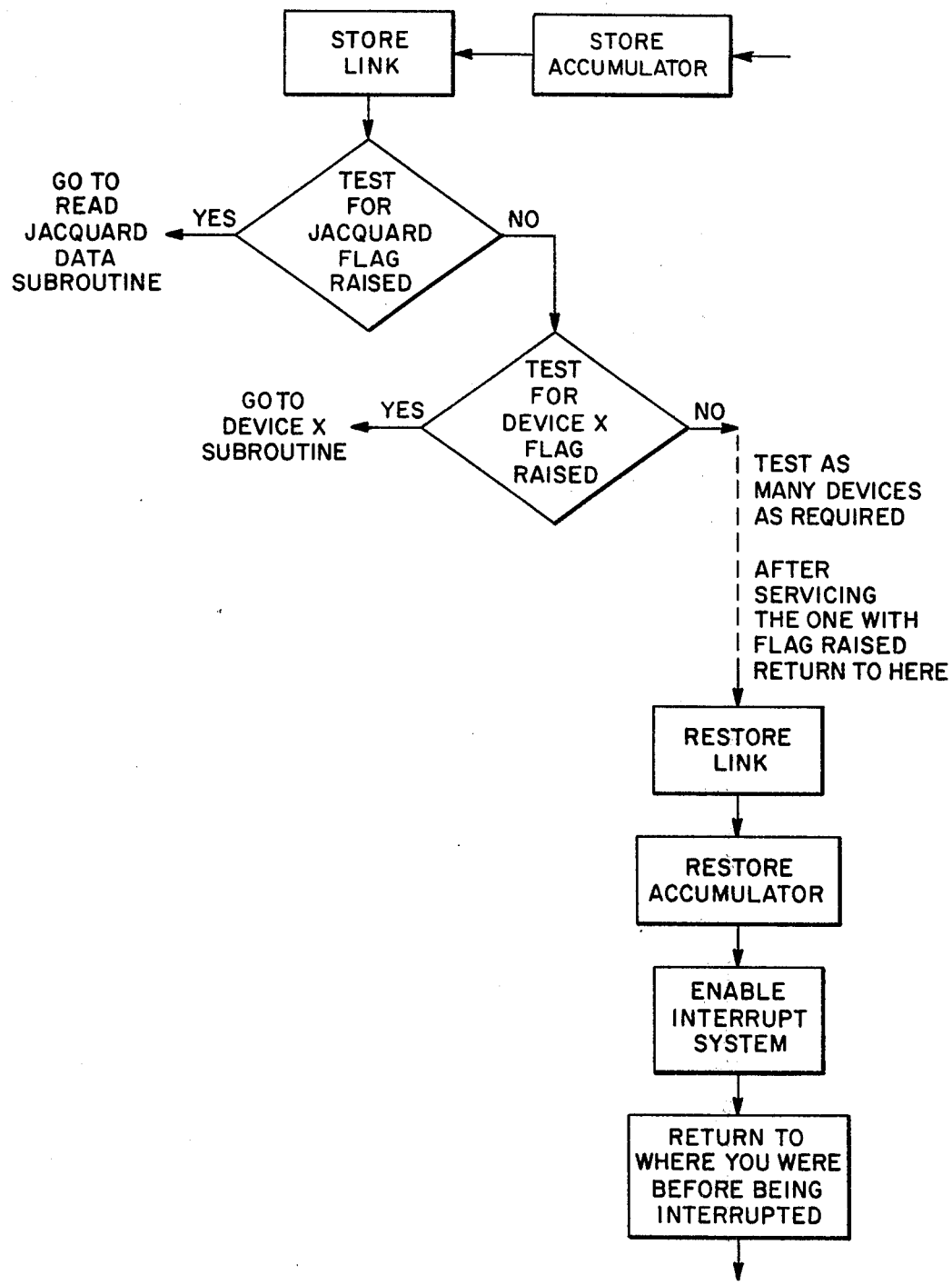
FIG. 15 is a flow chart of the subroutine employed at the time an interrupt request is recognized by the computer.

Upon initialization, the computer 20 via the general program in its memory, types on the teletype 26 a request to the operator to select a mode of operation. The operator enters the desired mode (read, edit, duplicate, output) and the computer then switches to that mode selected. For example, for the read mode of operation, the operator first enters job identification information to be used for later retrieval. The computer then asks for specific information required for processing, pick size and number of picks which comprise the total weave pattern of the Jacquard card. The computer 20 records the job information on the magnetic tape in the tape deck 28 and starts the drive sprocket via a motor (not shown) and the Card 16 is moved. When the holes of the first row are aligned, the encoder 22 provides a pulse which (a) latches the information of the first row of 168 possible bits of information representing holes and no holes in the latch circuits 15 and (b) inputs a signal to the counter 24 and the gate 68. Upon receipt of an input from the decoder 66 gate 68 is enabled. The flag flip-flop 70 previously set provides the "interrupt request" signal to the computer 20. Before the second row of pick n is in alignment, the following sequence of operation occurs. All 168 holes/no holes data for the first row of pick n is now stored in the latch circuits 15. When the computer 20 receives the interrupt request in its interrupt connector, it switches to a subroutine, the flow chart of which is shown in FIG. 15, to determine which peripheral device has requested service. The interrupt handler subroutine stores the information, i.e., the accumulator and link contents, so the information may later be retrieved to continue on from the point of interruption. The computer 20 then generates a device code, IOP combination which means "skip on device X flag raised." If the transport system 12 and optical reader 14 are simply being tested, then the 1 IOT and "skip" command from the device decoder 76, FIG. 9, are allowed to pass through gate 74, FIG. 8, because the Flag flip-flop 70 is set. This generates a "skip" command to the skip connection of the computer 20, causing it to jump over the next instruction in its normal sequence. For example, the computer program could be, in part: (1) skip on Flag flip-flop 70; (2) skip; (3) go to subroutine read mode; (4) skip on X flag; (5) skip; and (6) go to Device X subroutine. This is known as a skip chain and is used to detect the peripheral device requesting service. By using this "skip on flag" technique, the computer determines that the interrupt request was made by the encoder 22.

Figure 11:
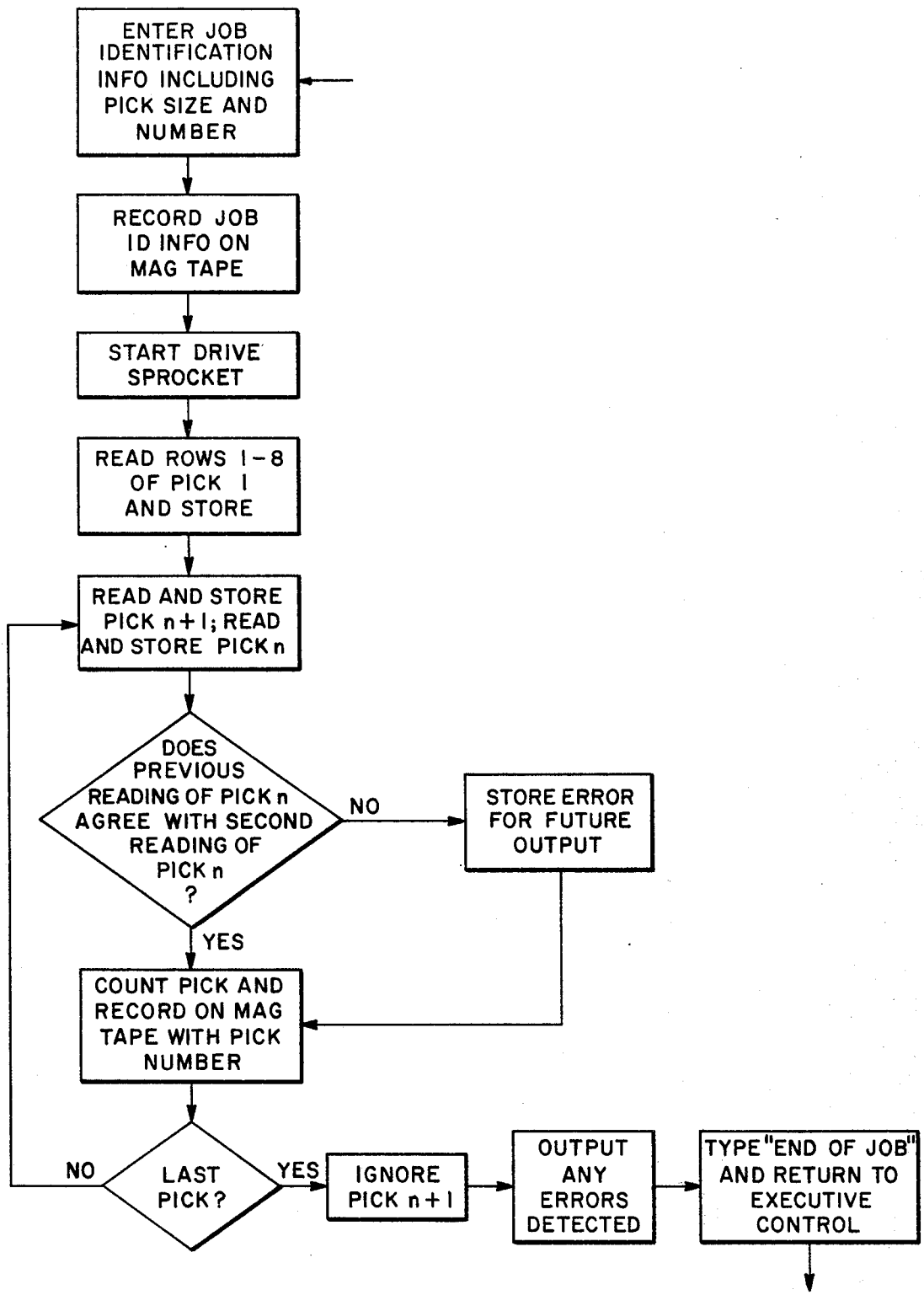
FIGS. 11, 12, 13, and 14 are the routines of operation in the read, edit, duplicate, and the output modes.
Figure 12:
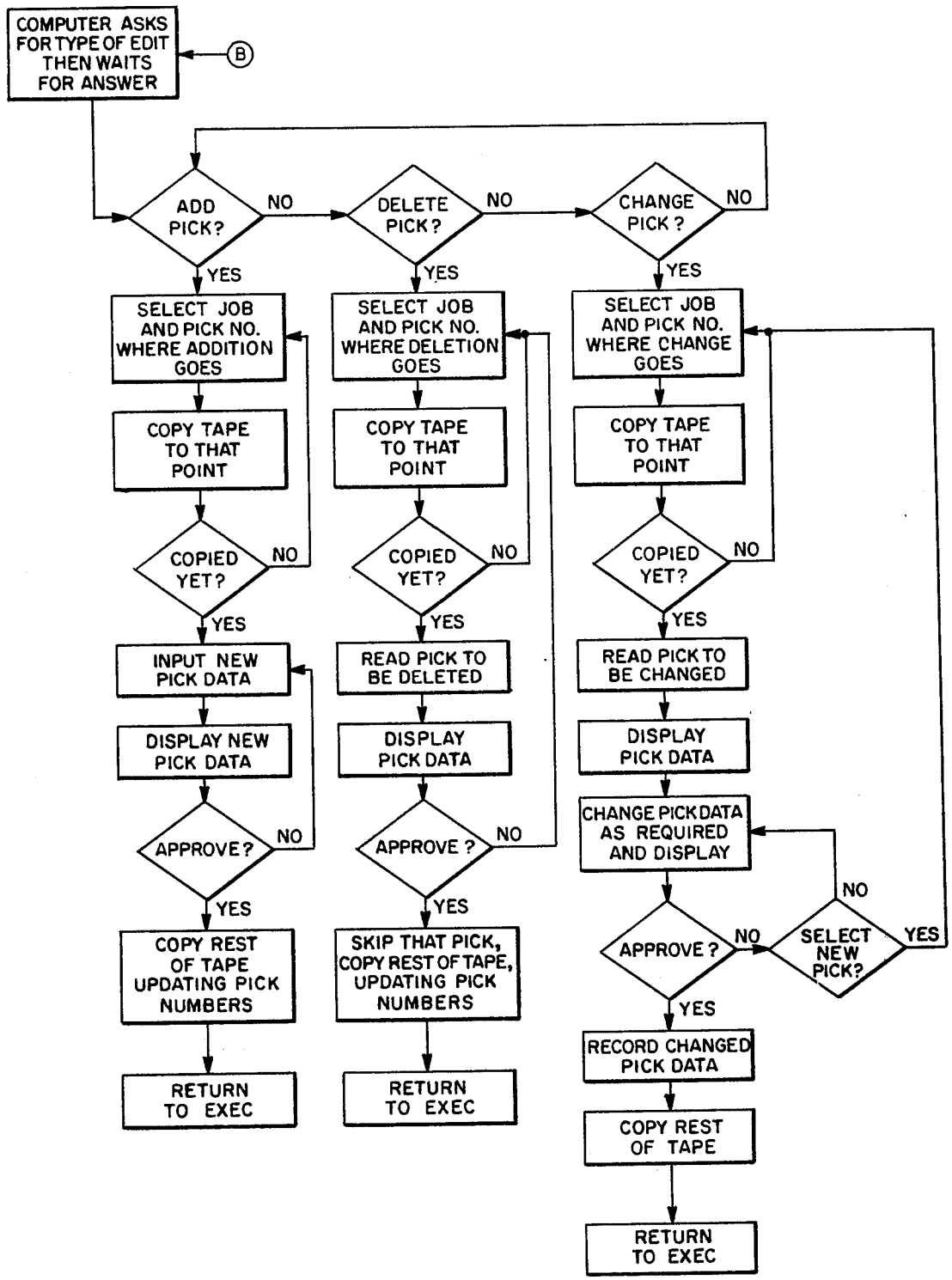

The computer 20 then sends a device code IOP combination, which is converted in the interface 18 to the multiplexer address, which causes the first eight bits (holes 1–8, see FIG. 5) of row one of pick n to be selected for output, FIG. 7. Specifically, referring to FIG. 6, the bits of information are stored such as shown on the latch circuits identified as 7475 for one segment. Referring to FIG. 9, the device decoder 76 first provides an output to the segment select decoder 82, selecting the first segment and then information transferred via the group select decoder 78 provides in the encoder 80 the group select multiplexer address. The first eight bits (holes 1–8) of pick n, once addressed, and referring now to FIG. 7, are applied to the gates 60a-h. 1 represents a hole and 0 represents no hole. The computer now sends a device code, 4 IOP combination, which causes the input from line d of the device decoder combined with the output IOT4 to enable the AND gate 62 to allow the information to enter the data buss 64 to the computer. Successively, 8 bits at a time are addressed and loaded into the computer until all data has been transferred. Subsequently, the computer sends another command via the interface which clears the interrupt request flip-flop 70 via AND gate 72. Thus, the computer 20 via the interface 18 addresses each successive eight-bit group in pick n, storing the transferred data in its memory until all 168 bits have been transferred. This data is stored in the computer memory until row 1 of pick n is in register with the second set of apertures 50b and 46b. Referring to FIG. 11 for the first pick n−1. At this time, in the same manner as before, row 1 of pick n is read and stored in the computer memory and compared with the original data stored for row 1. If there are any errors, they are noted. This sequence occurs at each hole alignment until the entire pick, eight readings, is read. Further, any check of previous data is completed and the data is translated to magnetic tape from the computer 20 via the interface TM8-E. Also, at this time, rows 1 of pick n+1 successively in register with apertures 50a and 46a have the information therein read, latched, and stored. The counter 24 monitors the reading and on the 9th pulse corresponding to the blank row between successive picks inhibits the AND gate 68. This prevents the "interrupt request" from going to the computer 20. After the inhibited count has passed, the card is again positioned for reading of data from row 1 of pick n+1 and n+2. The "interrupt request" is generated and the reading sequence is again initiated. The computer is counting the number of picks it has read because two variations to the above sequence are required. On the first pick, no immediate comparison is possible because the card has not reached the second set of 168 photodetectors as yet. The computer therefore does not attempt a comparison. When the last pick is read the second time, the computer ignores pick n+1 data since it is not part of the pattern. When all the cards are read the computer types out on the teletype any errors it detected while reading, identifying them by pick number and "end" (1-1344). The computer then types out "end of job" and returns control to the executive program which requests mode desired.

The second mode of operation is Edit. This mode flowchart is show in FIG. 12. There are three sub-modes within this mode, specifically, add, delete, and change. When the edit mode is selected, the computer first requests the type of sub-mode desired. The operator enters, via the Teletype 26, the job identification and pick number after loading the appropriate tape. The computer searches the tape until it finds the job selected and then within that job it copies the data up to the pick selected for editing. Then depending on sub-mode, new pick(s) are added, old pick(s) are deleted (in both cases the remaining picks are renumbered to agree) or, in the change sub-mode, the selected pick is displayed. This display may take any form consistent with the peripheral equipment. available (teletype, line printer, CRT, etc.). For a display on the teletype, for instance, it is not possible to show all 168 hole/no hole data in one continuous row since the teletype line is only 80 characters long. In this case, the display will be of one-third of a pick at a time or 1 segment of 56 bits. The computer will type out a pattern of o's and -'s corresponding to holes and no holes in the same format as a person would see on the original card. A complete pick consists of 1344 possible holes each corresponding to an "end" or warp thread in the loom. Using the error printout of the read mode, the operator can decide for himself by looking at the original whether a hole or no hole is correct and change it accordingly. After either deleting, adding, or changing the remainder of the data is copied with the pick numbers updated if required. At the conclusion of this operation, the control is returned to the executive program which again requests mode desired.

Figure 13:
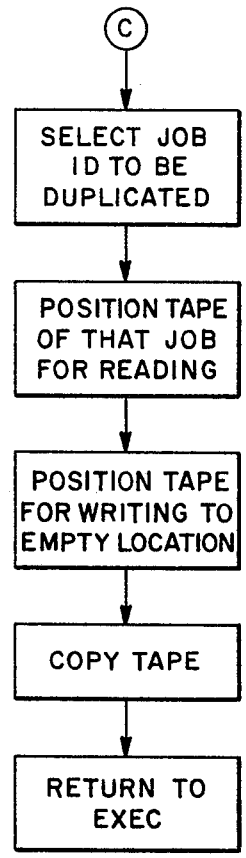

The duplicate mode as shown in FIG. 13 is a straight-forward sequence of identifying a specific job on tape selected by the operator and copying that job onto another tape.

OUTPUT MODE

Figure 14:
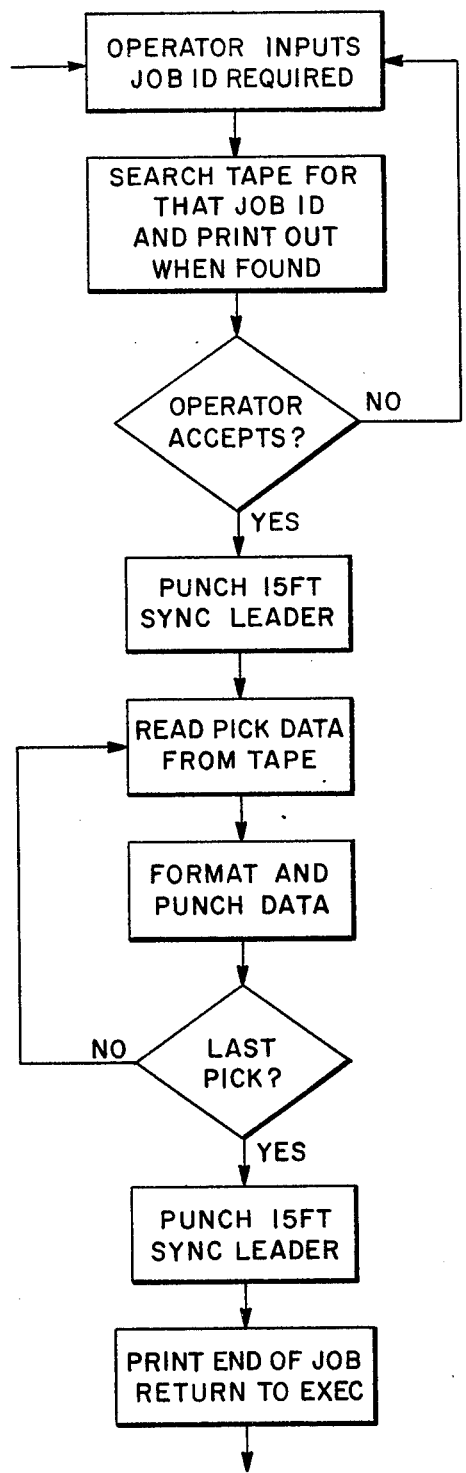

Referring to FIG. 14, the operator first inputs via the teletype 26 the job identification number he desires. This number may be any alpha-numerical combination up to 10 units as desired. The computer 20 searches the tape deck 28 until it finds that job identification number and then signifies it has found the job identification number by printing it on the teletype 26 for verification. This transmission of information is accomplished through the appropriate interfaces in the computer mentioned above. If the operator accepts the information as valid, then a punched paper tape is generated.

The computer 20 includes an interface TA68 which converts the information from the computer 20 to information suitable for operation of a paper tape punch 30 as shown in FIG. 1, such as a Teletype Corporation Model BRPE. The paper tape punched is standard 8-level computer paper tape and the information punched thereon may be used with a modified Jacquard repeater head such as a VSI Model No. 3600, Viable Systems, Inc., Needham, Massachusetts. This repeater head is also disclosed in U.S. Ser. No. 427,827, filed Dec. 26, 1973, which application is hereby incorporated by reference in its entirety in this application. As shown in FIG. 14, the computer 20 is instructed to punch a predetermined length of synchronizing leader. To accomplish this the computer jumps to the following subroutine:

1. load computer accumulater with zeros (no holes);
2. punch 56 rows of no holes;
3. punch 4 rows of holes at the end of the first third of the pick;
4. punch 56 rows of no holes;
5. punch 4 rows of holes at the end of the second third of the pick;
6. punch 56 rows of no holes;
7. punch 4 rows of holes at the end of the third third of the pick;
8. repeat steps one through seven nine times; and
9. return to "read pick data from tape" step of output mode.

Thus, the computer via the interface effects the operation of the punch 30 and approximately 15 feet of synchronizing leader are provided at the beginning of the first pick of a weave pattern. This leader is used to thread the punched paper tape in the modified Jacquard repeater head. As instructed by the computer, FIG. 14, the weave pattern row by row pick by pick is punched on the paper tape.

When the job identification number for the weave pattern is initially entered the number of picks for that particular weave pattern is included, FIG. 11. In the output mode, the computer 20, knowing the number of picks for the weave pattern being punched on the paper tape, recognizes the last pick. As shown in FIG. 14, a second 15-foot section of synchronizing leader is punched. The computer 20 at the completion of the last pick jumps to a subroutine as described above, except that at the completion of the subroutine it jumps to the last step of the output mode shown in FIG. 14. At the completion of the job, the computer prints "end of job" on the teletype 26 and returns control to the executive routine.

If desired, the data stored may be output on another format, such as punched cards. The punched cards may then be inserted in a Jacquard card cutting machine. The transfer of information from a storage medium via a computer to punch cards and then to a card cutting machine is described in U.S. Pat. No. 3,671,944. Alternatively, the data stored may be output to a piano punch or cutting machine.

Having described the invention, what is now claimed is:

1. An apparatus for reading, storing and retrieving the weave pattern on a Jacquard card which comprises:
   a. first means to read and convert on a hole/no hole basis to machine data, at least a portion of the weave pattern in a Jacquard card;
   b. a drive transport system to effect relative movement between the card and the first means to read and convert the pattern in information transfer relationship with the means to read and convert; wherein the drive transport system includes a first aperture plate, the apertures in said plate arrayed on the pattern of a Jacquard card, which apertures correspond to at least one row of a pick of a Jacquard card, and the means to read and convert includes an energy source on one side of the plate and sensors on the other side of the plate in optical communication with the energy source and the apertures, whereby as the holes in the card are aligned with the apertures, the hole/no hole information for that portion of the card which is aligned is read and converted to machine data;

c. means to store the weave pattern as machine data, said means responsive to the means to read and convert; and d. control means in communication with the drive transport system, the means to read and convert, and the means to store, to control in timed sequence the movement of the card, the reading and converting of the portion of the weave pattern to machine data, and the storing of the data, which control means includes means to stop temporarily the movement of the card each time a row of pattern in the card is aligned with the apertures and to move the card until the next row is aligned with the apertures, at which time the sequence of reading and converting is repeated.

2. The apparatus of claim 1 wherein the apertures of the plate are arrayed on the pattern of one row of a Jacquard card.

3. The apparatus of claim 2, which includes:

a second aperture plate spaced apart from the first aperture plate, the apertures of said plate being in register with the apertures of the first plate; and sprocket means to engage the Jacquard card to move said card, which sprocket means are responsive to the control means.

4. An apparatus for reading, storing and retrieving the weave pattern on a Jacquard card which comprises:

a. first means to read and convert on a hole/no hole basis to machine data, at least a portion of the weave pattern in a Jacquard card;

b. second means to read and convert on a hole/no hole basis a portion of the weave pattern of the Jacquard card spaced apart from the first means to read and convert, said second means adapted to reread that portion read by the first means to read and convert; and wherein both the first and second means to read and convert include means to latch the information so converted;

c. a drive transport system to effect relative movement between the card and the first and second means to read and convert the pattern in information transfer relationship with the means to read and convert;

d. means to store the weave pattern as machine data, said means responsive to the means to read and convert; and e. control means in communication with the drive transport system, the means to read and convert, and the means to store, to control in timed sequence the movement of the card, the reading and converting of the portion of the weave pattern to machine data, including means to compare the latched information and to transmit said compared information to the means to store.

5. The apparatus of claim 4, wherein the control means includes means to identify any errors in said compared information.

6. The apparatus of claim 4 wherein the drive transport system includes a first aperture plate having at least two sets of apertures, the apertures of each set arrayed in spaced apart parallel relationship on the pattern of a Jacquard card, the first means to read and convert includes an energy source on one side of the first set of apertures and the second means to read and convert includes an energy source on one side of the second set of apertures; first and second sets of sensors are disposed on the other side of the plate, the first set of sensors in optical communication with the first energy source and the first set of apertures, and the second set of sensors in optical communication with the second energy source and the second set of apertures, whereby as the holes in the card are aligned with the first and second sets of apertures, the hole/no hole information for that portion of the card which is aligned is read and converted to machine data.

7. The apparatus of claim 6, wherein the apertures of the first and second set each correspond to one row of a pick of a Jacquard card.

8. The apparatus of claim 7, wherein the control means includes means to effect the sequential movement of the Jacquard card to stop the card each time a row of the card is aligned with the apertures and after the card is stopped to read and convert the weave pattern to machine data and to latch said data; and wherein the card is moved until the next row is aligned with the apertures, at which time the sequence of reading converting and latching is repeated.

9. The apparatus of claim 8 which includes means to identify any errors in said information.

10. The apparatus of claim 9 which includes means to retrieve the stored information.

11. A method for the storage of weave information on a Jacquard card which includes:

a. effective relative movement between a Jacquard card having a hole/no hole weave pattern therein and a sensing head;

b. reading and converting on a hole/no hole basis to machine data at least a portion of the weave pattern on the Jacquard card;

c. rereading the weave information of the Jacquard card;

d. comparing the reread information with the information originally read;

e. identifying any errors between said compared information;

f. storing said compared information; and g. controlling the movement of the card and the reading and converting, and storing of the information in timed sequence.

12. The method of claim 11, which includes:

reading and converting the weave information on a row by row, pick by pick basis.

13. The method of claim 11, which includes:

aligning the weave pattern on the Jacquard card with a plurality of apertures in an aperture plate which apertures are arrayed on the basic pattern of a Jacquard card.

14. The method of claim 11, which includes retrieving the information so stored.

* * * * *